United States Patent [19]

Suwijn

[11] Patent Number: 5,586,848
[45] Date of Patent: Dec. 24, 1996

[54] MACHINE TOOL CHIP REMOVAL SYSTEM

[75] Inventor: Paul W. Suwijn, Pittsford, N.Y.

[73] Assignee: The Gleason Works, Rochester, N.Y.

[21] Appl. No.: 433,277

[22] Filed: May 2, 1995

[51] Int. Cl.$^6$ .............................. B65G 47/46; B23C 1/00; B23F 23/00

[52] U.S. Cl. .................................. 409/137; 29/DIG. 94; 29/DIG. 102; 82/901; 198/371.1; 408/67; 409/135

[58] Field of Search .................................. 409/137, 136, 409/135; 29/DIG. 61, DIG. 73, DIG. 94, DIG. 95, DIG. 99, DIG. 100, DIG. 102; 408/67; 451/453; 82/901; 198/371.2, 371.3, 494, 362, 371.1, 495; 210/222

[56] References Cited

U.S. PATENT DOCUMENTS

| | | | |
|---|---|---|---|
| 3,094,486 | 6/1963 | Goeltz | 210/222 |
| 3,537,586 | 11/1970 | Hunkeler | 210/222 |
| 4,818,378 | 4/1989 | Elliott | 209/225 |
| 5,025,690 | 6/1991 | Myers | 82/901 |
| 5,078,256 | 1/1992 | Hatano et al. | 29/DIG. 53 X |
| 5,228,814 | 7/1993 | Suwijn | 409/12 |
| 5,294,220 | 3/1994 | Ohmstede et al. | 409/137 |

FOREIGN PATENT DOCUMENTS

| | | | |
|---|---|---|---|
| 2394480 | 1/1979 | France . | |
| 3921375 | 1/1991 | Germany | 198/371.2 |
| 004644 | 1/1986 | Japan . | |
| 180436 | 7/1988 | Japan . | |
| 274453 | 11/1990 | Japan | 409/137 |
| 4-171154 | 6/1992 | Japan | 409/137 |
| 6-277977 | 10/1994 | Japan | 409/137 |

OTHER PUBLICATIONS

Patent Abstracts of Japan, vol. 10, No. 151 (M–483), May 31, 1986, (JP 61–004644 published Jan. 1, 1986 to Mitsubishi Heavy Industries Ltd.).

Patent Abstracts of Japan, vol. 12, No. 448 (M–768), Nov. 24, 1988, (JP 63–180436 published Jul. 25, 1988 to Mitsubishi Heavy Industries Ltd.).

Ophey, Lothar, "Gear Hobbing Without Coolant", *Gear Technology*, Nov./Dec. 1994, pp. 20–24.

Phillips, Robert, "New Innovations in Hobbing—Part II", *Gear Technology*, Nov./Dec. 1994, pp. 26–30.

*Primary Examiner*—William R. Briggs
*Attorney, Agent, or Firm*—Robert L. McDowell; Ralph E. Harper

[57] ABSTRACT

Apparatus capable of performing wet and dry machining processes such as a hobbing machine for producing spur and helical gears, shafts, splines, and the like, by wet and dry hobbing methods. The apparatus comprises means to remove metal chips resulting from the wet and dry machining processes from the apparatus via respective independent wet and dry chip outlets. The chip removal means comprises a transfer means located in the machine base with the transfer means being reversible in direction in order to convey metal chips, emanating from the machining process, to the respective wet or dry chip outlet. The chip removal means enables metal chips from wet machining processes to be conveyed to and discharged from an outlet in one side surface and metal chips from dry machining processes to be conveyed to and discharged from an outlet in another side surface.

26 Claims, 5 Drawing Sheets

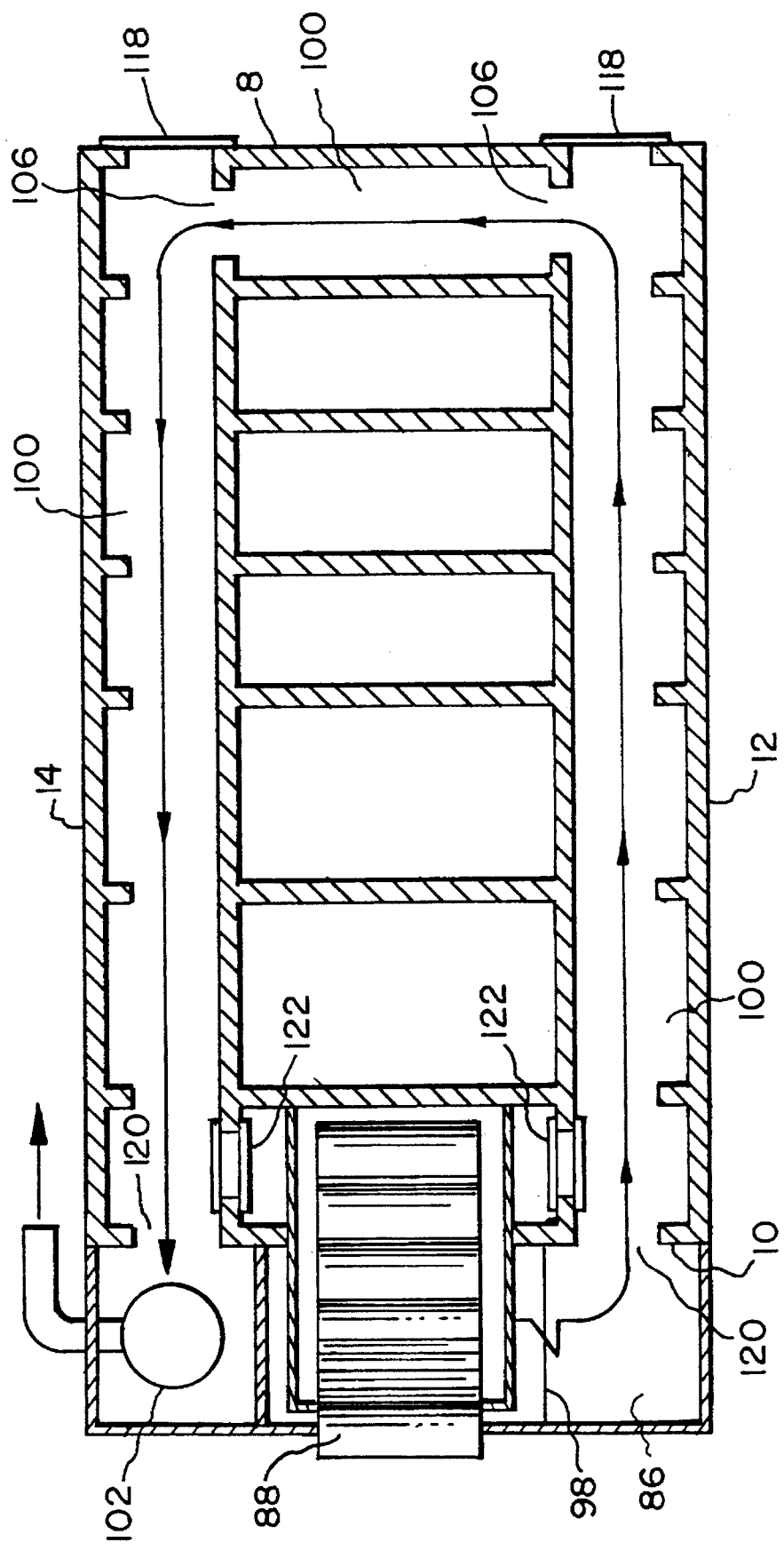

MACHINE TOOL CHIP REMOVAL SYSTEM

FIELD OF THE INVENTION

The present invention relates to machine tools and the manner in which metal chips from machining processes are removed therefrom. Specifically, the present invention is directed to hobbing machines for producing tooth articles and a chip removal system for these machines which permits independent removal of wet and dry metal chips.

BACKGROUND OF THE INVENTION

Traditionally, machining of metal workpieces to produce desired articles, such as hobbing processes to produce spur and helical gears, shafts, splines, and the like, has been performed in the presence of a coolant medium supplied to the point of engagement of a tool and workpiece. Aside from the obvious function of cooling the tool and workpiece, coolant also reduces tool wear and serves to flush metal chips, which emanate from the machined workpiece, away from the area of engagement of tool and workpiece and out of the machine. Once flushed away from the tool and workpiece, chips may separated from the coolant by filtering or by magnetic separator means such as, for example, those disclosed in U.S. Pat. Nos. 3,094,486 to Goeltz or 3,537,586 to Hunkeler.

While coolant certainly has many advantages, it also has its drawbacks. Coolant is expensive to purchase, and in some cases disposal costs are just as expensive. Coolant mist and coolant oil smoke are considered to be environmental hazards. Therefore, machines must include a mist/smoke collector as a means to remove such airborne contaminants from the atmosphere within the machine enclosure. Coolant circulation in a machine tool requires a pump and hoses to deliver coolant to the machining area, and a chip separator to remove metal chips from the coolant. Such separators are somewhat more complicated than simple powered drag lines used to convey dry chips. In some cases, filters may be needed to remove other debris from the coolant, or a coolant chiller may be required to control both the coolant and the machine equilibrium temperature.

Recently, dry machining processes such as dry hobbing have drawn attention as an alternative to processes utilizing coolant (wet machining processes) and discussed in Phillips, "New Innovations in Hobbing—Part II", *Gear Technology*, November/December 1994, pp. 26–30. However, in the absence of coolant, temperatures of both the tool and the machine are considerably higher. Hence, increased tool wear, due to thermal effects and the lack of an extreme pressure lubricant at the point of chip formation, becomes a serious issue. Materials such as high speed steel coated with titanium aluminum nitride, and tungsten carbide coated with titanium nitride, have demonstrated some success at withstanding dry hobbing process conditions. Laboratory success has also been demonstrated with coated ceramic-metallic (cermet) hobs, which cannot operate in contact with a coolant due to the susceptibility of these materials to cracking from thermal shock.

It has been stated by some that carbide hobbing can be performed at a faster rate in a dry process than when coolant is applied. However, current production evidence suggests that this may only be the case when tool coatings improve beyond their current level, since an acceptable tool life becomes a severe problem as dry hobbing rates are increased. Nonetheless, such improvements should be expected over time.

It may be seen that dry hobbing has the potential to overcome many serious and costly drawbacks associated with the use of a liquid coolant. Also, dry chips are normally more valuable as a recyclable material than chips which are residually wetted by a process fluid. Parts cut without coolant do not need washing, prior to further processing such as heat treatment.

However, as discussed above, the heat generated in dry hobbing is a major contributor to tool wear but it also has detrimental effects on the machine itself, causing differential growth of components such as spindles, bearings, or the machine frame. Much of the process heat in dry machining is removed by the chips which must be removed from the machine as quickly as possible and in a manner by which they do not contact the machine frame for any extended period of time. One way to remove dry chips is to permit the hot chips to slide by gravity toward a chip conveyor built into the base of a hobbing machine. Such a chip removal system is shown in Ophey, "Gear Hobbing Without Coolant", *Gear Technology*, November/December 1994, pp. 20–24.

The workpiece itself is also relied upon as a means of removing heat from the cutting chamber in dry hobbing. Hot exiting workpieces must be tolerated, since they remove heat that would otherwise produce higher equilibrium temperatures in machine spindles, bearing housings, structures, and tooling. Certain kinds of common, effective workholding fixtures cannot be used during aggressive dry machining processes because of thermal growth or closure of fixture elements which would produce jamming rather than the free introduction and release of successive workpieces.

It can be seen that both wet and dry hobbing have their advantages as well as disadvantages and usage of either process is dependent upon the circumstances of the particular job. However, until now, it has not been possible to easily convert from wet-to-dry or dry-to-wet processes on a single machine without associated time consuming efforts such as draining (or filling) of coolant reservoirs, replacing chip hoppers, and removing (or installing) any coolant/chip separating equipment.

It is an object of the present invention to provide a machine tool capable of wet and dry machining with very little changeover time required to switch from wet-to-dry and dry-to-wet processes.

It is a further object of the present invention to provide a system to remove metal chips from a machine tool, regardless of wet or dry operations, in which the chips are transferred to separate outlets for wet and dry metal chips.

It is a further object of the present invention to provide a gear hobbing machine capable of wet and dry machining and having independent chip disposal outlets for wet and dry metal chips.

An additional object of the present invention is to provide a gear hobbing machine, employing the chip removal system referred to above, in which the upper deck surfaces of the cutting chamber and the workholding equipment can optionally be irrigated during the performance of a dry machining process to achieve improved machine thermal control. The falling chips would, in this arrangement, transfer their heat directly to the irrigation/coolant liquid, and in turn to all extremes of the machine base by circulation of the coolant after chip separation.

Also, the work fixture itself may be cooled by a liquid circulation sleeve with an outlet to the optional deck irrigation. Neither the optional deck irrigation nor the optional work fixture cooling means results in the wetting of the tool or the workpiece.

SUMMARY OF THE INVENTION

The present invention is directed to an apparatus capable of performing wet and dry machining processes such as a hobbing machine for producing spur and helical gears, shafts, splines, and the like, by wet and dry hobbing methods.

The apparatus comprises a machine base having top and bottom surfaces and a plurality of side surfaces. The apparatus further comprises a tool support and a workpiece support located on the base top surface and includes means to move the tool and workpiece supports relative to one another to engage a tool and workpiece in a manner to machine the workpiece. Furthermore, the apparatus comprises means to remove metal chips resulting from the wet and dry machining processes from the apparatus via respective independent wet and dry chip outlets.

The chip removal means comprises a first passageway located in the machine base with the first passageway extending between two side surfaces. The chip removal means also includes a second passageway located in the machine base with the second passageway originating at an opening in the top surface of the machine base and communicating with the first passageway, the second passageway providing a means of passage to the first passageway for metal chips emanating from the workpiece as a result of the machining processes.

The chip removal means further comprises a transfer means located in and extending the length of the first passageway with the transfer means being reversible in direction in order to convey metal chips, emanating from the machining process and received via the second passageway, to the outlet in either of the two side surfaces. The chip removal means thereby enables metal chips from wet machining processes to be conveyed to and discharged from an outlet in one side surface and metal chips from dry machining processes to be conveyed to and discharged from an outlet in another side surface.

The chip removal means also prevents contact between the exiting hot chips and passageway surfaces of the machine base during transport of the chips out of the machine. This limits the thermal transfer from the chips to particular regions of the machine base, and thereby the potential for serious machine distortion.

A heat-exchange means is also proposed which accepts the thermal energy of the chips as they gravitate toward the exit passageway. This self-contained liquid circulation system allows complete distribution of the absorbed thermal energy about the periphery of the machine base, bringing upper and lower base surfaces into common equilibrium. The result is a regular, orthogonal machine growth which is easily compensated by well-known automatic means. Angular distortion between tool and work columns is minimized, since this distortion is normally produced by differential heating of upper and lower machine base surfaces. Much more complicated, and less predictable, thermal growth compensation algorithms are thereby avoided. The self-contained liquid circulation system operates without wetting the chips in any way during dry machining operations.

BRIEF DESCRIPTION OF THE DRAWINGS

FIG. 4 is a cross-section of the machine base showing the machine base coolant channel.

DETAILED DESCRIPTION OF THE PREFERRED EMBODIMENTS

The preferred embodiments of the present invention will be described with reference to the accompanying drawings. In all drawing figures, similar components will be referenced by like reference numbers.

Figure 1:
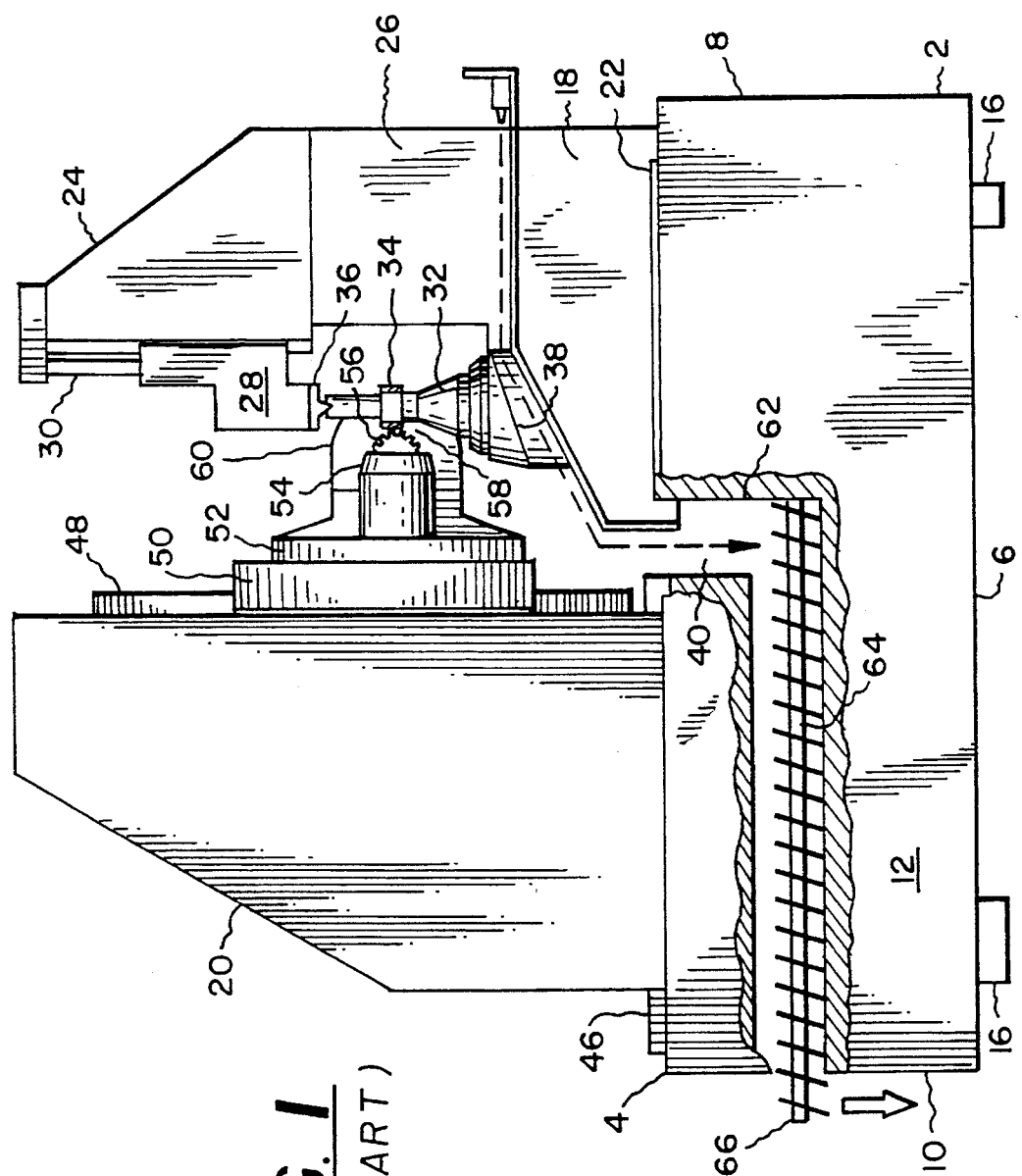
FIG. 1 is a schematic side view of a prior art gear hobbing machine.

FIG. 1 illustrates a gear hobbing machine of the type disclosed in U.S. Pat. No. 5,228,814 to Suwijn, the disclosure of which is hereby incorporated by reference. Although the present invention is not directed to the particular cutting operations or related components of a hobbing machine, it is believed a general description of a hobbing machine may be beneficial. Reference should be made to the above-cited patent for a more detailed description.

The machine comprises a machine base 2 having a top surface 4, a bottom surface 6, end surfaces 8, 10, side surfaces 12, 14 (FIG. 4) and supports 16. A work head 18 is located on top surface 4 and is movable in the direction of the width of the machine base along bedways 22. Work head 18 includes an upper tailstock column section 24 and a lower tailstock column section 26. Attached to the upper section 24 is a tailstock assembly 28 which may be raised and lowered along guiderails 30, by any suitable means such as a piston (not shown). Work head 18 further includes a workpiece fixture 32, for holding workpiece 34 in position, and a spindle housing 38 which may contain a chuck mechanism for activating a collet, for example, to clamp workpiece 34 in position.

The hobbing machine also includes hob column 20 movable in the direction of the length of the machine base 2 along bedways 46. Hob column 20 includes vertically disposed guideways 48 for movement of an axial slide 50 to which is mounted hob head 52. The hob head 52 is an angularly adjustable trunnion which incorporates a tool outboard support housing 54, a hob spindle housing 58, and a hob drive gearbox 60. A hobbing tool 56 is mounted between outboard support 54 and spindle housing 58.

Relative movements of the hobbing tool and the workpiece are controlled by separate motors which may act through speed reducing gearing (or belting, alternately) and ball screw drives. These motions include movement of hob column 20 along the length of machine bed 2, movement of work head 18 across the width of machine bed 2, and movement of axial slide 50 vertically with respect to machine bed 2. Rotation is imparted to hobbing tool 56 and to workpiece 34 and angular motion is imparted to hob head 52 by separate motors. Each of the drive motors is associated with either a linear or rotary encoder (not shown) and a computer (not shown) as part of a computer numerically controlled (CNC) system which governs the operation of the drive motors in accordance with instructions input to a computer. The encoders provide feedback information to the computer concerning the actual positions of each of the movable, linear and rotational machine axes.

The hobbing machine of FIG. 1 has previously been utilized for only wet hobbing processes. Coolant is supplied through various nozzles directed to the point of machining. Coolant nozzles directed to the point of machining are well known in the art and have not been illustrated. The metal chips emanating from the hobbing process are flushed through top surface opening 40 and into a passageway 62 where a conveying means, such as an auger 64, transports them to outlet 66. At the outlet 66, chips may separated from the coolant by any suitable means, such as an inclined magnetic roller conveyor, or may be transported along with the coolant to a centralized separation unit. Once the chips are removed, the coolant may also, in exceptional cases, be filtered and/or cooled before being circulated back through the machine to the point of machining. Both chips and coolant may alternately be transported back to a centralized chip reclamation facility with a common coolant storage tank and pumping system serving a multiplicity of machines.

Figure 2:
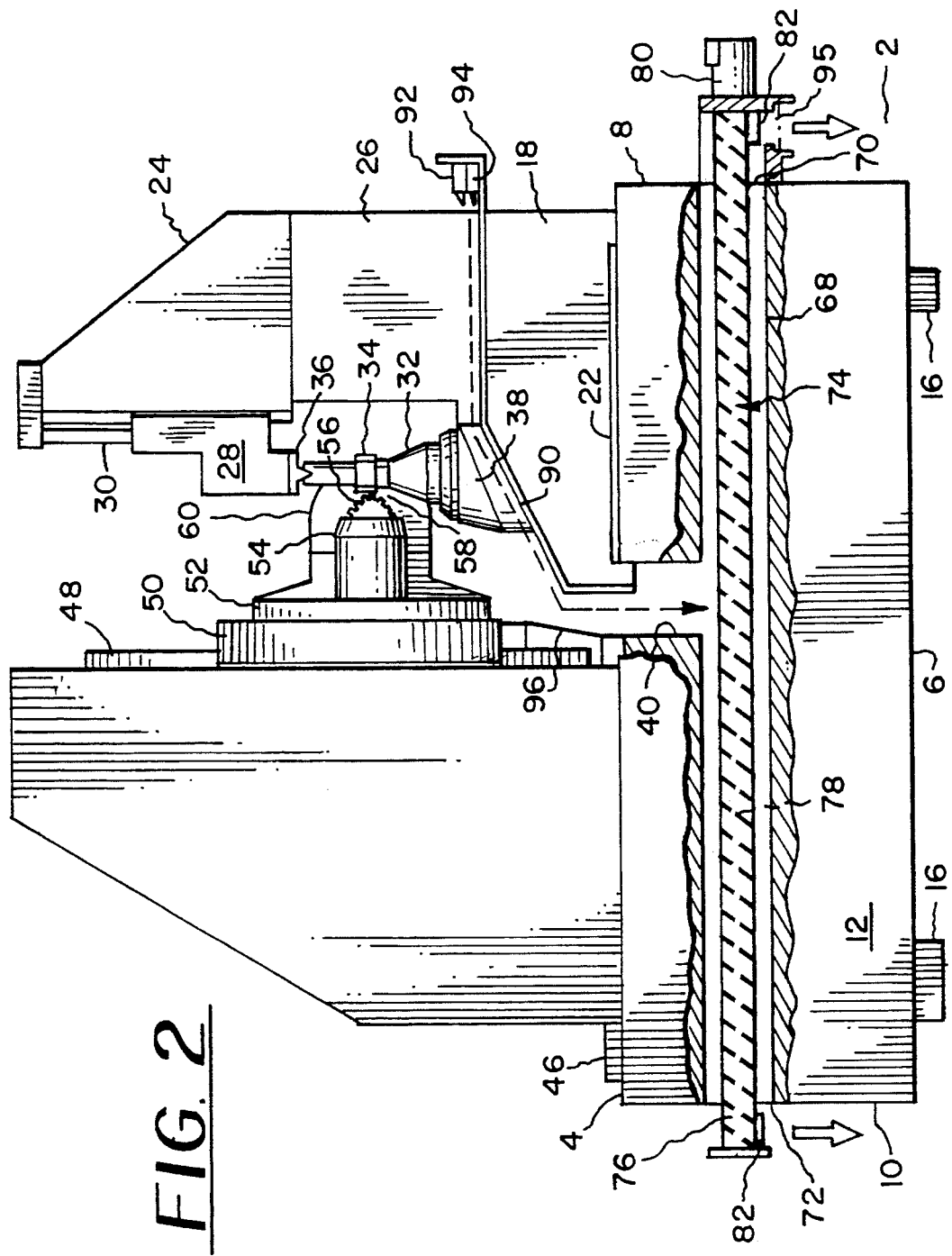
FIG. 2 illustrates a gear hobbing machine including the inventive chip removal system.

With the present invention, the machine of FIG. 1, or any other applicable machine tool, may now be utilized for wet and dry machining processes. FIG. 2 shows the modified machine including a chip removal system comprising a first passageway 68 extending the length of the machine base 2 and forming outlets 70 and 72 in respective end surfaces 8 and 10. First passageway 68 communicates with a second passageway comprising opening 40. Although the passageway 68 is shown extending between end surfaces 8 and 10, alternatively, it may extend between side surfaces 12 and 14 or may be angularly positioned between a side and end surface such as side surface 12 and end surface 10.

Located in passageway 68 is a means 74 to transfer metal chips to either of the outlets 70 or 72, Preferably, transfer means 74 comprises a non-magnetic outer tube 76, such as a non-magnetic stainless steel, containing a reversible rotatable helically-shaped magnet 78 extending the length of the tube 76. The magnet is rotated by means of a motor 80 located on either end of tube 76. In the hobbing process, metal chips emanating from the workpiece 34 pass through opening 40 and into passageway 68 where they adhere to tube 76 due to their attraction to the internal magnet 78. Rotation of magnet 78 causes chips to move along the tube to either outlet 70 or 72 depending upon the direction of rotation. Each end of tube 76 includes a scraper means 82 to wipe chips from the tube 76.

Figure 3:
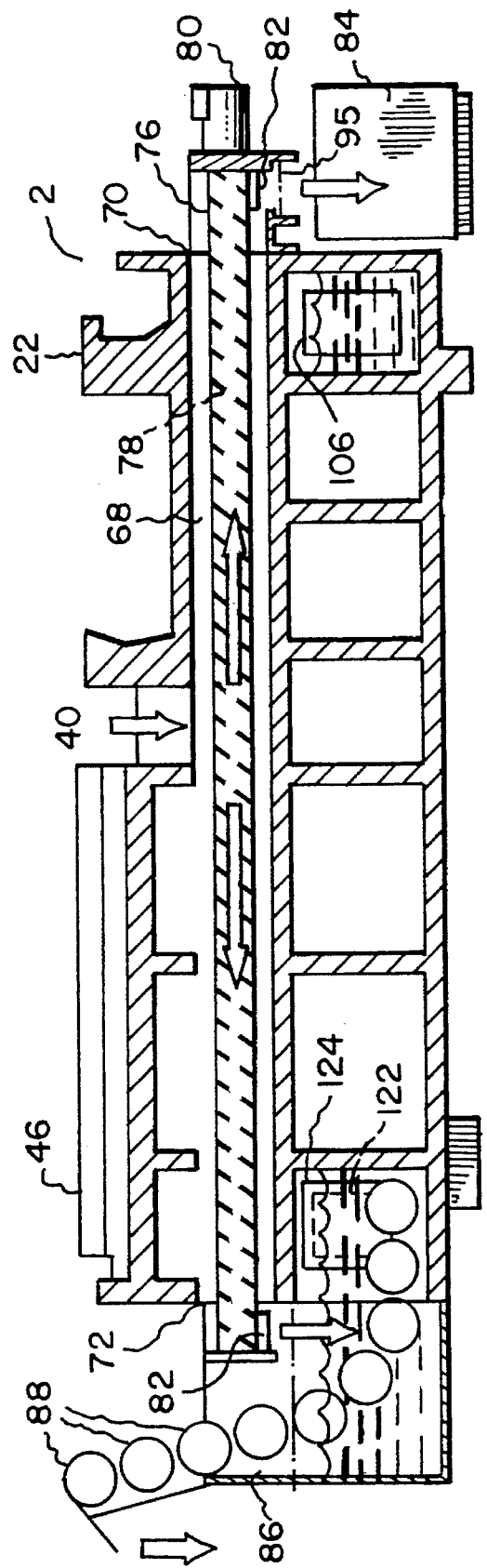
FIG. 3 illustrates a cross-section through the lengthwise center of the machine base showing the inventive chip removal system.

It can be seen that with the chip removal system of the present invention, wet chips can be transferred to an outlet at one end of the machine base 2 and dry chips can be transferred to an outlet in the other end of the machine base. FIG. 3 illustrates this feature of the present invention by showing a lengthwise cross-section through the center of the of the machine base 2. As an example, dry chips passing through opening 40 to passageway 68 adhere to tube 76 and are transferred along tube 76, by the action of the internal rotating helically-shaped magnet 78, to outlet 70 where scraper 82 wipes the chips from tube 76. The dry chips fall into chip hopper 84. Of course, the chips may be transferred away from the machine in any appropriate manner such as falling onto a conveying surface as pad of a centralized scrap reclamation unit. With the transfer means of the present invention, chips adhere to the tube 76 and do not come into contact with the surfaces of the machine base. Thus, little or no heat from the hot chips is transferred to the machine base.

With the above example, chips from wet hobbing also pass through opening 40 to passageway 68 where they are attracted to tube 76. The internal helically-shaped magnet is rotated by motor 80 in the opposite direction to that for dry hobbing to transfer chips to outlet 72 where they are wiped from the tube 76 by scraper 82 and fall into a suitable wet-chip receiving means 86 such as a magnetic chip separator comprising an inclined series of magnetic rollers 88 which carry the chips away from the machine while allowing coolant to drain off into receptacle 86. Coolant in passageway 68 drains into receptacle 86, owing to the closure of cover 95, which is closed by the operator, when converting from dry to wet machining processes.

In switching from wet-to-dry processes, the direction of motor 80 is reversed, cover 95 is opened, and coolant flow to deck irrigation nozzles 92 (see FIG. 2) and to the nozzles directed at the point of machining is shut off. Air flow, which may be pulsed or intermittent to effect a cleansing of horizontal portions of the deck, is initiated through nozzles 94 (see FIG. 2), and optionally to a nozzle (not shown) which cleans fine chips from the contacting surface between the workpiece and the workholding fixture. A tool change and/or a work fixture change will often accompany conversion from one type of process to the other. In changing from dry-to-wet process, the direction of motor 80 is reversed, cover 95 is closed, coolant flow is initiated through deck irrigation nozzles 92 and to the nozzles directed at the point of machining, and air flow to the deck and work fixture upper surface is shut off.

The hobbing machine includes additional components which enhance chip movement to the opening 40. FIG. 2 illustrates sheet metal plate 90 (such as stainless steel) placed on, at least, the sloped surface of work support 18. The smooth surface of the sheet metal plate 90 enhances chip movement. Additionally, air jet nozzle 94 and/or coolant jet nozzle 92 may be included to provide a fluid flow along the metal plate 90 to further assist in moving chips to opening 40 in dry or wet processes. If desired, metal plate 90 and plates 108 (FIG. 5) may also be vibrated by any known means to assist chip movement to opening 40.

A screen 96 may be included below axial slide 50 to deflect chips, broadcast freely from the point of machining toward inclined plates 108 (see FIG. 5), into opening 40. Screen 96 also serves to prevent hot chips from falling upon upper base surfaces in the area of radial guideways 46. Screen 96 is attached at the machine base and is stored in a housing below axial slide 50 in such a manner, for example on a spring-loaded roller, that will allow additional screen to be dispensed upon upward movement of axial slide 50 and withdrawing movement of hob column 20, and excess screen to be taken-up upon downward movement of axial slide 50 and advancing movement of hob column 20. The screen 96 is preferably made of a high-strength material such as KEVLAR®.

The present invention provides enhanced flexibility over wet-only or dry-only machines by enabling both wet and dry processes to be performed on a single machine. The present arrangement also permits dry machining to occur with coolant flushing of the chips, and optional cooling of workholding fixture 32 via an irrigation sleeve (not shown), to prevent undesirable thermal expansion or closure of elements of fixture 32, without wetting either workpiece 34 or hobbing tool 56. In this embodiment, coolant flow is shut-off to the area of the tool 56 and workpiece 34 while coolant flow to nozzle 92 is maintained. Thus, dry machining of the workpiece takes place but as chips fall to the surface of plate 90 covering the work support 18, they are flushed into opening 40 with the aid of coolant from nozzle 92 and exit the machine in the same manner as discussed above with reference to wet machining.

Figure 5:
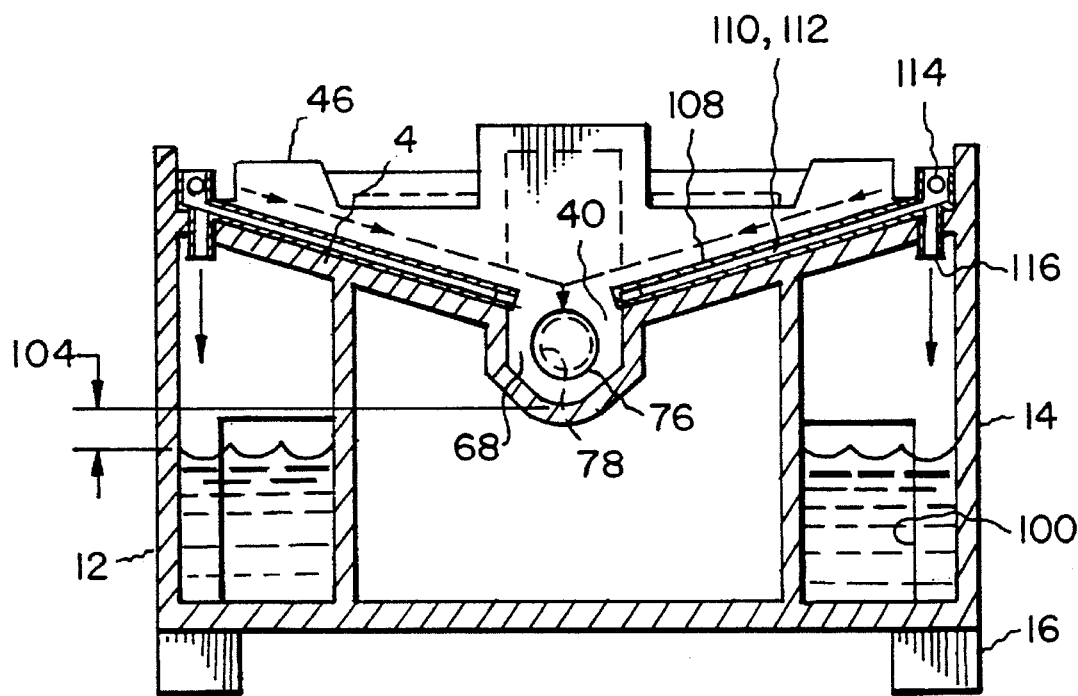
FIG. 5 is a cross-sectional view of the machine base adjacent to a side surface, showing the machine base coolant channel, the intersection of chip exit passageways, and a heat-exchange means on portions of the machine base upper surface.

The machine of the present invention also offers the advantage over other hobbing machines in that coolant present in the machine for wet machining processes need not be drained in order for complete dry machining to occur. In many machines, coolant is held in a tank which, during dry machining, effectively serves as a heat sink continually absorbing heat and transferring it to local areas of the machine base itself, resulting in non-uniform thermal expansion. FIG. 4 is a top view of a cross-section of machine base 2 at a location below passageway 68 which illustrates the path of coolant flow for wet machining. As receptacle 86 fills, coolant overflows weir 98 and is circulated through a channel 100 along the outer walls of the machine base. Coolant flows through channel 100 to pump 102 where it is pumped back to nozzles at the tool and workpiece and/or to nozzle 92. Coolant circulating through channel 100 acts to thermally stabilize the machine base. FIG. 5 shows a crosswise sectional view of machine base 2 illustrating coolant channel 100. Opening 106 (FIG. 4) allows coolant to flow from the side portion to the end portion of channel 100.

In dry machining operations, coolant flow is shut-off to at least the nozzles directed at the tool and workpiece but coolant in channel 100 remains in the machine base and is circulated by pump 102 to thermally stabilize the machine base. The presence of coolant in channel 100 does not interfere with the movement of chips through passageway 68 because the level of coolant is maintained below the passageway 68 as can be seen at 104 in FIG. 5 which represents a cross-section of the width of the machine base at opening 40. With this arrangement, coolant can remain circulating in the machine base 2 and continue to thermally stabilize it even when complete dry machining processes are occurring.

Another feature of the present inventive hobbing machine is shown in FIG. 5 and comprises heat exchanger cover plates 108 for the top surfaces 4 of machine base 2 in the vicinity of opening 40. Cover plates 108 are made of sheet metal, such as stainless steel, and follow the sloped portion of the top surfaces 4 in the area of opening 40. The plates 108 may comprise coolant passages 110, 112 (see FIG. 6) which permit coolant form pump 102 to be introduced at inlets 114, circulate through passages 110, 112, and exit to the circulation channel 100 at outlets 116. With these plates, a considerable amount of heat contained in chips emanating from dry machining processes is removed quickly before it can be absorbed by the machine. In a similar manner, sheet metal cover 90 may also include coolant passages therein to assist in cooling metal chips. Alternatively, the sloped portion of top surface 4 in the vicinity of opening 40 may be cooled by coolant jets impinging on the bottom surface of the sloped portion. Additionally, cover plates 108 may include air jet nozzles or liquid jet nozzles (similar to air jet nozzle 94 and/or coolant jet nozzle 92 in FIG. 2) to provide a fluid flow along the metal plates 108 to further assist in moving chips to opening 40 in dry or wet processes.

Figure 6:
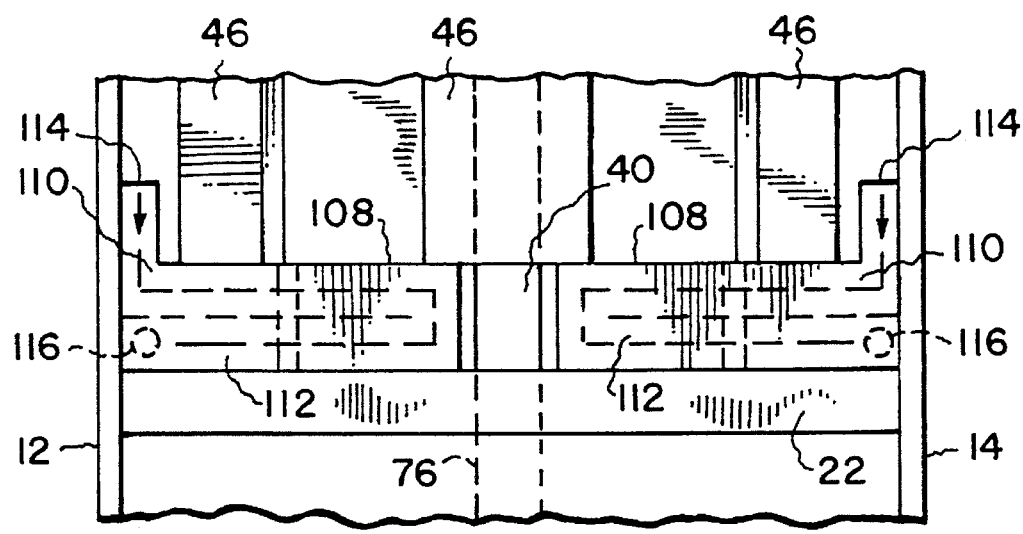
FIG. 6 is a partial top view of the machine base, showing the region of the intersection of chip exit passageways and illustrating heat-exchange means on potions of the machine base upper surface.

FIG. 6 represents a partial top view of machine base 2, showing the region of intersection between opening 40 and passageway 68. It may be seen these optional inclined heat exchange plates 108 may entirely cover inclined upper base surfaces 4 in the region of opening 40. The self-contained passage of coolant from arrival points 114 to exit points 116, via passages 110 and 112, permits the absorption of chipborne heat and its immediate transfer to the circulation path 100 in the lower portion of the machine base. In this manner the absorbed heat can be shared directly with the multiplicity of lower base structural surfaces, from which it is also radiated to the external atmosphere through surfaces such as outer walls 12 and 14 of the machine base 2.

Although the machine of FIG. 3 is oriented with dry chips being discharged through end surface 8 and wet chips being discharged through end surface 10, the machine is not limited to this arrangement. FIG. 4 shows the machine base coolant channel 100 arranged for the orientation of FIG. 3. However, all that is necessary to reverse the wet and dry chip receptacles 86 and 84, respectively, is removal of covers 118 from end surface 8 and placing them in openings 120 in end surface 10 and removal of covers 122 from inner openings 124 (FIG. 3) near end surface 10 and placing them in inner openings 106 near end surface 8. By changing cover positions as described, wet chip receptacle 86 may be placed at end surface 8 and dry chip receptacle 84 may be placed at end surface 10. With this ability, a machine may be set-up to meet the requirements of a manufacturing facility and then changed if the machine is moved or the facility configuration is changed.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. An apparatus for performing wet or dry machining processes, said apparatus comprising a machine base having top and bottom surfaces and a plurality of side surfaces, said apparatus further comprising a tool support located on said base top surface and a workpiece support located on said base top surface, said apparatus including means to move said tool and workpiece supports relative to one another to engage a tool and workpiece in a manner to machine said workpiece, said apparatus comprising means to remove metal chips resulting from said wet or dry machining processes from said apparatus via respective independent wet and dry chip outlets, the chip removal means comprising:

a first passageway located in said machine base, said first passageway extending between an outlet in two of said plurality of side surfaces, a second passageway located in said machine base, said second passageway extending from said top surface to said first passageway and communicating therewith, said second passageway providing a means of passage to said first passageway for metal chips resulting from said machining processes, transfer means located in and extending the length of said first passageway, said transfer means being reversible in direction in order to convey metal chips from said machining processes and received via said second passageway to said outlet in either of said two side surfaces, thereby enabling metal chips from wet machining processes to be conveyed to and discharged from an outlet in one side surface and metal chips from dry machining processes to be conveyed to and discharged from an outlet in another side surface.

2. The apparatus of claim 1 wherein said transfer means comprises a non-magnetic tube containing a helically-shaped rotatable magnet, the direction of rotation of said magnet being reversible in order to convey chips in either direction along said tube.

3. The apparatus of claim 2 wherein said tube comprises scraping means adjacent the end thereof for removing metal chips from said tube.

4. The apparatus of claim 1 wherein said machine base further includes means to circulate coolant throughout said base to maintain thermal equilibrium in said base during wet and dry machining processes.

5. The apparatus of claim 1 wherein coolant necessary for wet machining processes is not removed from said apparatus prior to dry machining processes.

6. The apparatus of claim 4 wherein said first passageway is located above the level of said coolant circulated in said base.

7. The apparatus of claim 1 further including means to urge metal chips resulting from said machining processes into said second passageway.

8. The apparatus of claim 7 wherein said means to urge comprises a smooth surface sloping downward toward said second passageway, said smooth surface covering at least one of said work support and said machine top surface.

9. The apparatus of claim 8 wherein said means to urge further comprises means to provide a stream of air along said smooth sloping surface covering at least said work support to enhance movement of metal chips along said smooth sloping surface.

10. The apparatus of claim 8 wherein said means to urge further comprises means to provide a stream of liquid along said smooth sloping surface covering at least said work support to enhance movement of metal chips along said smooth sloping surface.

11. The apparatus of claim 8 further comprising deflecting means located adjacent said second passageway for deflecting metal chips from said smooth sloping surface into said second passageway.

12. The apparatus of claim 8 wherein said means to urge further includes coolant passages below said smooth surface.

13. An apparatus for producing spur and helical gears and the like by wet or dry hobbing processes, said apparatus comprising a generally rectangular machine base having top and bottom surfaces, a pair of opposed side surfaces, and a pair of opposed end surfaces, said apparatus further comprising a tool support located on said base top surface and a workpiece support located on said base top surface, said apparatus including means to move said tool and workpiece supports relative to one another to engage a tool and workpiece in a manner to machine said workpiece, said apparatus comprising means to remove metal chips resulting from said wet or dry hobbing processes from said apparatus via respective independent wet and dry chip outlets, the chip removal means comprising:

a first passageway located in said machine base, said first passageway extending between an outlet in each of said end surfaces or said side surfaces, a second passageway located in said machine base, said second passageway comprising an opening in said top surface communicating with said first passageway, said second passageway providing a means of passage to said first passageway for metal chips resulting from said hobbing processes, transfer means located in and extending the length of said first passageway, said transfer means being reversible in direction in order to convey metal chips from said hobbing processes and received via said second passageway to said outlet in either surface of said end surfaces or said side surfaces, thereby enabling metal chips from wet hobbing processes to be conveyed to and discharged from an outlet in one end or side surface and metal chips from dry hobbing processes to be conveyed to and discharged from an outlet in the other opposed end or side surface.

14. The apparatus of claim 13 wherein said transfer means comprises a non-magnetic tube containing a helically-shaped rotatable magnet, the direction of rotation of said magnet being reversible in order to convey chips in either direction along said tube.

15. The apparatus of claim 14 wherein said tube comprises scraping means adjacent the end thereof for removing metal chips from said tube.

16. The apparatus of claim 13 wherein said first passageway extends between an outlet in each of said end surfaces.

17. The apparatus of claim 13 further including means to close said outlet in said opposed side surface through which metal chips are not being discharged.

18. The apparatus of claim 13 wherein said machine base further includes means to circulate coolant throughout said base to maintain thermal equilibrium in said base during wet and dry hobbing processes.

19. The apparatus of claim 18 wherein said first passageway is located above the level of said coolant circulated in said base.

20. The apparatus of claim 13 wherein coolant necessary for wet machining processes is not removed from said apparatus prior to dry hobbing processes.

21. The apparatus of claim 13 further including means to urge metal chips resulting from said machining processes into said second passageway.

22. The apparatus of claim 21 wherein said means to urge comprises a smooth surface sloping downward toward said second passageway, said smooth surface covering at least one of said work support and said machine top surface.

23. The apparatus of claim 22 wherein said means to urge further comprises means to provide a stream of air along said smooth sloping surface of at least said work support to enhance movement of metal chips along said smooth sloping surface.

24. The apparatus of claim 22 wherein said means to urge further comprises means to provide a stream of liquid along said smooth sloping surface of at least said work support to enhance movement of metal chips along said smooth sloping surface.

25. The apparatus of claim 22 further comprising deflecting means located adjacent said second passageway for deflecting metal chips from said smooth sloping surface into said second passageway.

26. The apparatus of claim 22 wherein said means to urge further includes means coolant passages below said smooth surface.

* * * * *